(12) United States Patent
Paillet et al.

(10) Patent No.: US 7,796,841 B2
(45) Date of Patent: Sep. 14, 2010

(54) MONOLITHIC IMAGE PERCEPTION DEVICE AND METHOD

(75) Inventors: Guy Paillet, Corte Madera, CA (US); Anne Menendez, Penngrove, CA (US)

(73) Assignees: AGC Flat Glass North America, Inc., Alpharetta, GA (US); Norlitech, LLC, Petaluma, CA (US)

( * ) Notice: Subject to any disclaimer, the term of this patent is extended or adjusted under 35 U.S.C. 154(b) by 1111 days.

(21) Appl. No.: 11/477,571

(22) Filed: Jun. 30, 2006

(65) Prior Publication Data

US 2007/0014469 A1    Jan. 18, 2007

Related U.S. Application Data

(60) Provisional application No. 60/694,988, filed on Jun. 30, 2005.

(51) Int. Cl.
  *G06K 9/20* (2006.01)
(52) U.S. Cl. ........................................ 382/312
(58) Field of Classification Search .................. 382/312, 382/321; 348/207.99, 207.1, 207.2; 359/362; 398/164
  See application file for complete search history.

(56) References Cited

U.S. PATENT DOCUMENTS

| | | | |
|---|---|---|---|
| 5,621,863 | A | 4/1997 | Boulet et al. |
| 5,701,397 | A | 12/1997 | Steimle et al. |
| 5,710,869 | A | 1/1998 | Godefroy et al. |
| 5,717,832 | A | 2/1998 | Steimle et al. |
| 5,740,326 | A | 4/1998 | Boulet et al. |
| 6,160,729 | A | 12/2000 | Jung et al. |
| 6,221,687 | B1 | 4/2001 | Abramovich |

(Continued)

FOREIGN PATENT DOCUMENTS

CA    2 149 478 A1    1/1996

(Continued)

OTHER PUBLICATIONS

Cat et al., "SIMPil: An OE Integrated SIMD Architecture For Focal Plane Processing Applications", 1996, Proceedings of MPPOI '96, pp. 44-52.*

(Continued)

*Primary Examiner*—Jose L Couso
(74) *Attorney, Agent, or Firm*—Rothwell, Figg, Ernst & Manbeck, P.C.

(57) ABSTRACT

An apparatus which can acquire, readout and perceive a scene based on the insertion, or etching of photosensitive elements into or on a transparent or semi-transparent substrate such as glass. The substrate itself acts as the optical device which deflects the photons incident to the reflected image into the photosensitive elements. Photosensitive elements are interconnected together by a transparent or opaque wiring. A digital neural memory can be trained to recognize specific scenery such as a human face, an incoming object, a surface defect, rain drops on a windshield and more. Other applications include image-perceptive car headlight and flat panel display detecting and identifying the viewer's behavior (gaze tracking, face recognition, facial expression recognition and more). Yet another application includes sliding doors perceiving the direction and speed of an individual coming towards that door. Yet another application includes permanent damage detection (texture change) in dam, bridge or other manmade construction.

37 Claims, 12 Drawing Sheets

U.S. PATENT DOCUMENTS

| | | | |
|---|---|---|---|
| 6,332,137 | B1 | 12/2001 | Hori et al. |
| 6,606,614 | B1 | 8/2003 | Paillet et al. |
| 7,019,391 | B2 * | 3/2006 | Tran .......................... 257/678 |
| 7,242,449 | B1 * | 7/2007 | Yamazaki et al. ........... 349/116 |
| 7,488,950 | B2 * | 2/2009 | Mouttet ...................... 250/397 |
| 7,643,203 | B2 * | 1/2010 | Gousev et al. .............. 359/291 |

FOREIGN PATENT DOCUMENTS

| | | |
|---|---|---|
| CA | 2 149 479 C | 1/1996 |
| CN | 1 213 144 A1 | 9/1998 |
| EP | 0 694 852 A1 | 1/1996 |
| EP | 0 694 853 | 1/1996 |
| EP | 0 694 854 A1 | 1/1996 |
| EP | 0 694 855 A1 | 1/1996 |
| EP | 0 893 915 A2 | 1/1999 |
| JP | 08-171540 | 7/1996 |
| JP | 08-171541 | 7/1996 |
| JP | 08-171542 A | 7/1996 |
| JP | 08-171543 A | 7/1996 |
| JP | 08-069445 | 12/1996 |
| KR | 164943 B1 | 1/1999 |

OTHER PUBLICATIONS

Chai et al., "Impact of Power Density Limitation in Gigascale Integration for the SIMD Pixel Processor", Proceedings 20th Anniversary Conference on Advance Research in VLSI, 1999, Mar. 21-24, 1999, pp. 1-15.*

Chai et al., "Hyper-spectral Image Processing Applications on the SIMD Pixel Processor for the Digital Battlefield", IEEE Worshop on Computer Vision Beyon the Visible Spectrum: Methods and Applications, 1999, (CVBVS '99), Jun. 21-22, 1999, pp. 1-9.*

Komuro et al., "A Dynamically Reconfigurable SIMD Processor for a Vision Chip", IEEE Journal of Solid-State Circuits, vol. 39, No. 1, Jan. 2004, pp. 265-268.*

Wu et al., "Mapping Vision Algorithms on SIMD Architecture Smart Cameras", IEEE, 2007, pp. 27-34.*

Vitabile S. et al.: "Multi-layer perceptron mapping on a SIMD architecture," Neural Networks for Signal Processing, 2002, Proceedings of the 2002 12$^{th}$ IEEE Workshop on Sep. 4-6, 2002, Piscataway, NJ, pp. 667-675, XP010601311; ISBN:0-7803-7616-1 p. 669, paragraph 3, Figs. 1-2.

Koui Ohtake et al.: "Four-Story Structured Character Recognition Sensor Image with 3D Integration," Microelectronic Engineering, Elsevier Publishers BV., Amsterdam, NL, vol. 15, No. 1/4, Oct. 1, 1991, pp. 179-182, XP000292755; ISSN: 0167-9317, Fig. 2.

First Office Action, Chinese Patent Application No. 200680031521.7, issued Feb. 24, 2010, 2 pages, with English translation.

* cited by examiner

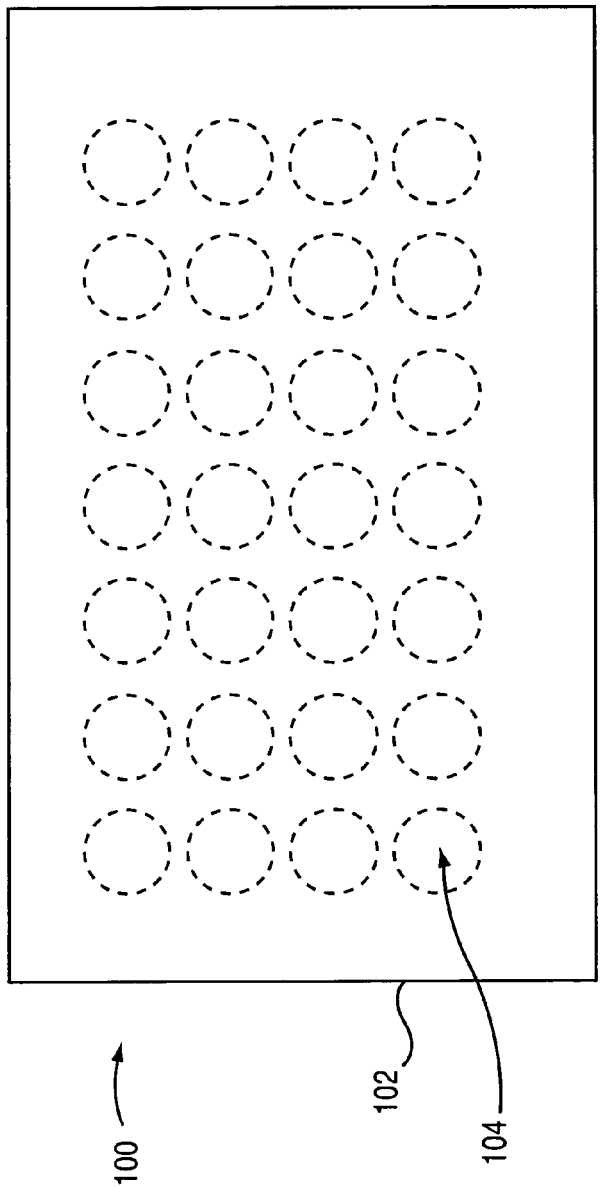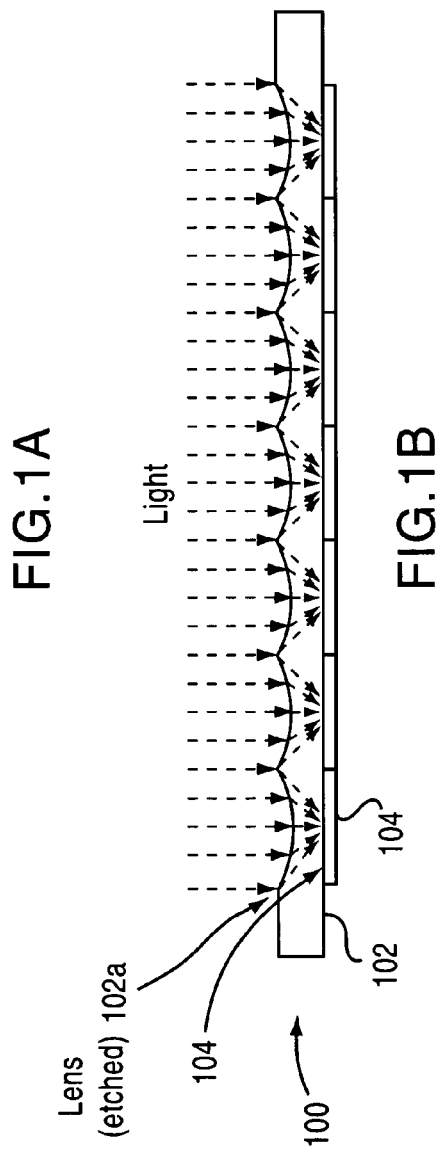
FIG.1A
FIG.1B

Detect a moving part,
identify and route it

Camera phone with
owner's identification

Door peep hole with visitor
detection and identification

CogniSensor with knowledge for size 1
CogniSensor with knowledge for size 2
CogniSensor with knowledge for size 3
CogniMem

MONOLITHIC IMAGE PERCEPTION DEVICE AND METHOD

CROSS-REFERENCE TO RELATED APPLICATIONS

This application claims priority to U.S. Provisional Patent Application No. 60/694,988, filed on Jun. 30, 2005, the entire contents of which are incorporated herein by reference.

BACKGROUND OF THE INVENTION

1. Field of the Invention

The present invention relates generally to imaging devices. In particular, the present invention relates to micro-devices for image recognition disposed on or embedded in a transparent substrate, such as glass.

2. Description of the Related Art

Transparent surfaces, such as glass, have existed for hundreds of years. Transparent surfaces were initially aimed at protecting a living space while letting the occupants have the perception of the outside world (landscape, weather and possible threat). More recently, transparent surfaces are in huge demand for the display industry, beginning with Cathode Ray Tubes (CRT) and more recently for Liquid Crystal Displays (LCD) and many other kinds of flat panel displays. In use, in most of the cases, a human or living organism (animal, plants) is positioned close to such transparent surfaces.

Image sensors have been available for a few decades (e.g., CCD or CMOS sensors). For example, see U.S. Pat. No. 6,617,565 for a single chip CMOS image sensor, the contents of which are incorporated herein by reference. Typical image sensors are based on camera designs and generally include an integrated circuit located behind a lens, which can be miniature or removable (e.g., screw mounting lens). Sensors are used to transform light energy (photons) into an electrical signal proportional to the amount of light received by the photosensitive elements that are organized into an array on the sensor. An image is synthesized from the output of the photosensitive elements.

Image recognition technology is becoming increasingly in demand. Video cameras of various sizes and makes are in demand for applications such as security, identification, intelligence, quality inspection, traffic surveillance and more. Video cameras are very often linked to display devices by either a wired or a wireless connection. Today, cell phones are routinely outfitted with miniature cameras connected to an LCD display device disposed therein.

Advanced image recognition requires high resolution imaging synthesis. Current image recognition systems operate at relatively slow speeds because of a lack of processing power and/or because processors can only process one pixel of an image at a time.

Thus, there is a need for new imaging recognition devices that are improved over the prior art.

SUMMARY OF THE INVENTION

It is an object of the present invention to provide an image recognition device that has a sensing area (e.g., photo sensitive elements) directly included in a transparent or semi-transparent material constituting the optical interface between the incident image and the sensing area. The image recognition device itself is preferably transparent or semi-transparent.

It also another object of the present invention to provide the sensing area with "local" decision capability by means of an array of trainable processing elements. In one embodiment of the present invention, trainable cognitive memory elements or cells are associated with one or more photosensitive elements. Local decision capability provides the advantage that it reduces the transmission requirements (i.e., bandwidth) of the device, especially when the number of photosensitive elements is large and when the transmission frequency of the photosensitive elements must be high. By providing a large array of sensing areas each having local decision capability, a high-resolution, high-speed imaging device is achievable.

According to an embodiment of the present invention, trainable cognitive memory elements can operate in parallel at low frequency and draw very low current. As a result, autonomous operation of each element is ensured and very economical energy sources, such as a solar cell or equivalent, can be used.

According to an embodiment of the present invention, a novel monolithic image recognition device is formed by association of one or more photosensitive elements to one or more trainable cognitive memory elements, all embedded into a substrate.

According to an embodiment of the present invention, a plurality of photosensitive elements associated to a plurality of trainable cognitive elements can be arranged in one or multiple arrays and spread over a flat transparent or semi-transparent substrate. The arrays can have variable geometry and connectivity. Typical geometry can be, but not limited to, a linear array of neurons in parallel, or a 2-dimensional array of neurons connected in a raster or honey-combed geometry.

Further applications and advantages of various embodiments of the present invention are discussed below with reference to the drawing figures.

BRIEF DESCRIPTION OF THE DRAWINGS

FIGS. 1A-B include respectively, a front and top view of an array of sensors disposed on a glass or plexiglass or other transparent plastic or transparent substrate, having etched lenses therein, according to an embodiment of the present invention;

DETAILED DESCRIPTION OF THE PREFERRED EMBODIMENTS

Figure 2:
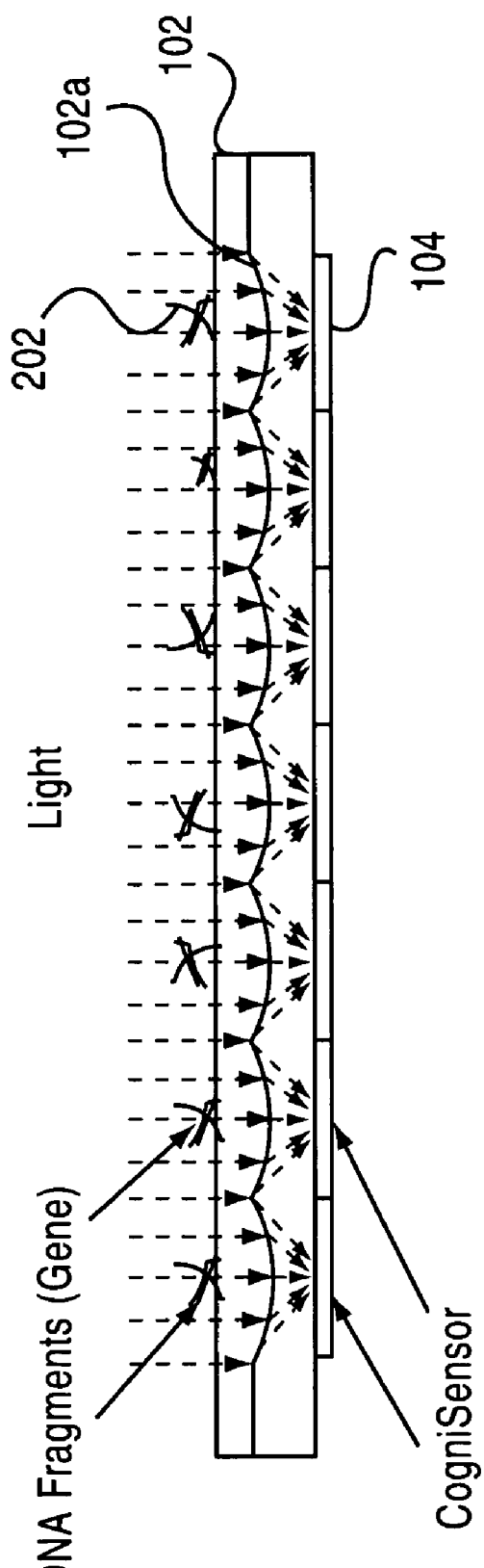
FIG. 2 is a top view of an array of sensors disposed on a glass or plexus substrate, having etched lenses therein, shown detecting DNA fragments, according to an embodiment of the present invention.

While the present invention may be embodied in many different forms, a number of illustrative embodiments are described herein with the understanding that the present disclosure is to be considered as providing examples of the principles of the invention and such examples are not intended to limit the invention to any specific preferred embodiments described and/or illustrated herein.

The present invention is an imaging device that may include a sensor perception device, such as a photosensitive element, connected, bound or otherwise associated to a trainable cognitive element, with both elements deposited chemically or otherwise on or embedded in the surface of a transparent substrate. The association of a sensing area with a trainable cognitive element having "local" decision capability is referenced throughout this document as a "CogniSensor." A trainable cognitive element is referenced throughout this document as a "CogniMem." Sensing areas are generally made up of one or more photosensitive elements, but other sensing arrangements are contemplated.

According to embodiments of the present invention, CogniSensors can be configured to recognize incoming light patterns (e.g., images or portions of images), process the incoming light patterns to make a local decision, and transmit results of or an indication of the local decision. A CogniSensor may include a number of components such as, but not limited to, local decision capability—data input logic, "neurons" and decision output logic, a memory buffer, solar cells for energy autonomy and more. Each CogniSensor preferably features reactive associative learning memories (REALM) arranged in parallel. According to an embodiment of the present invention, CogniMem are capable of pattern recognition without any computer instructions, whether digital or analog.

CogniMem may comprise one or more neurons, which are associative memories accessible in parallel that can react to input patterns similar to their own contents. Neurons can react individually or collectively by reinforcing their response based on the response of other neighboring neurons. This selection can be made through an Inhibitatory/Excitatory input line connected to the neurons.

The contents of the neurons of a CogniMem constitute "knowledge." Knowledge is a set of statically discriminative digital signatures. Knowledge can be static (loaded once) or dynamic (updated by the reaction of other neurons or loaded adaptively from an external knowledge base), but is preferably automatically generated by the learning process without the need of a computer to do so. CogniMem deposited on a same substrate can use identical or different knowledge.

CogniMem can be deposited on or embedded in (or otherwise coupled with) a substrate as part of a CogniSensor or stand-alone. In the former case, the CogniMem is typically dedicated to recognizing pixel data transmitted by a photosensitive element. In the latter case, the CogniMem may be used to support other CogniMem's and may be used, for example, to recognize different data types transmitted by other CogniMem units (for example to consolidate a pattern of responses from multiple CogniSensors).

The following listed patents and published applications, the entire contents of each of which are hereby incorporated by reference, describe various aspects of neuron and neural networks applicable to CogniMems and CogniSensors: U.S. Pat. No. 5,621,863—Neuron Circuit; U.S. Pat. No. 5,717,832—Improved neuron circuit architecture; U.S. Pat. No. 5,701,397—Circuit for pre-charging a free neuron circuit; U.S. Pat. No. 5,710,869—Daisy-Chain circuit for serial connection of neuron circuits; U.S. Pat. No. 5,740,326—Circuit for searching/sorting data in neural networks U.S. Pat. No. 6,332,137—Parallel associative memory for a stand-alone hardware recognition; U.S. Pat. No. 6,606,614—Single wire search and sort; Japanese applications JP8-171543—Daisy-Chain circuit for serial connection of neuron circuits; JP8-171542—Advanced loading circuit; JP8-171541—Aggregation Circuit (Search/Sort); JP8-171540—Neural Network and Neural chip; JP8-069445—Neuron circuit architecture; Korean patent application KR164943—Innovative neuron circuit architecture; European patents EP0694852—Innovative neuron circuit architecture; EP0694854—Improved neural semiconductor chip architecture; EP0694855—Search/Sort for neural networks; EP0694853—Circuit for pre-charging the input vector components in a free neuron circuit during the recognition phase; EP0694856—Daisy-Chain circuit for serial connection of neuron circuits; Canadian application CA2149478—Improved neuron circuit architecture; Canadian patent CA2149479—Improved neural semiconductor chip architecture The number of neurons implemented on a CogniMem can vary from 1 to N, with N theoretically unlimited due to the architecture of the neuron cell. Currently, N can be as high as about 1000. In general, N is determined by the application and in particular, from the diversity of patterns to be recognized and the type of decisions to transmit. One skilled in the art will recognize that the silicon technology may be a significant factor determining the number of neurons that can be provided per unit area.

An exemplary configuration of an image recognition device according to an embodiment of the present invention is illustrated in FIGS. 1A and 1B. FIG. 1A is a top view of the device 100, which includes a substrate 102 that can be made from a number of transparent or semi-transparent materials such as glass, plexiglass, transparent plastics, etc. One or more CogniSensors 104 (in this case, as an array) may be embedded into the substrate 102 or, as in this case, attached or glued to or otherwise coupled with a surface of the substrate 102 (See FIG. 1B). An optical path can be etched or deposited in front of each photosensitive element on the substrate. For example, the substrate 102 can be etched at the location of the CogniSensors 104 in order to create lenses 102a for each CogniSensor 104. Alternatively, a microlens 102a can be inserted into the substrate 102 (FIG. 2) or glued (FIGS. 3A-B) onto the substrate 102 in front of the photosensitive elements. Another option may be to alter the substrate to vary the reflective index of the portion of the substrate proximate each sensor, to focus incident light. As shown in FIG. 1B, incident light is focused on each CogniSensor 104 by the substrate lenses 102a.

The plurality of lenses 102a allows the CogniSensors 104 to cover a variety of fields of view, preferably equal to the substrate surface but may also possibly cover views narrower or larger than the field of view equal to the substrate surface. The microlenses 102a turn the array of CogniSensors 104 into a telecentric image perception device with an unlimited surface and view.

FIG. 2 is a top view of a monolithic imaging device according to another embodiment of the present invention. As shown, lenses 102a are embedded into substrate 102 and positioned over each CogniSensor 104. As an example of a use of the imaging device, DNA fragments 202 are shown being positioned on the surface of the substrate 102. Each CogniSensor 104 could be configured to recognize individually, or in collaboration with adjacent CogniSensors 104, a particular DNA fragment and output a signal when that fragment is identified.

Figure 3B:
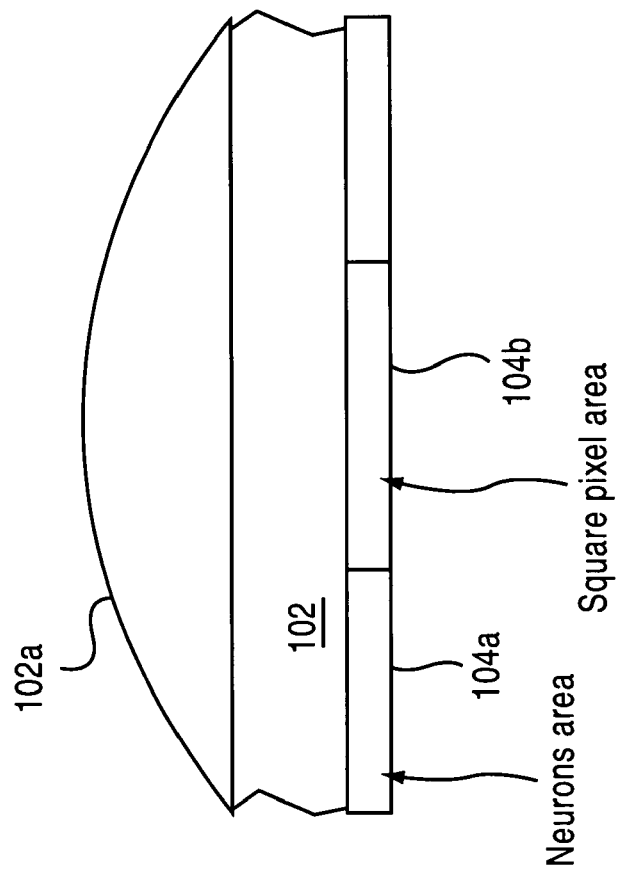
FIGS. 3A-B illustrate respectively a side and top view of a die of sensors according to one embodiment of the present invention.
Figure 3A:
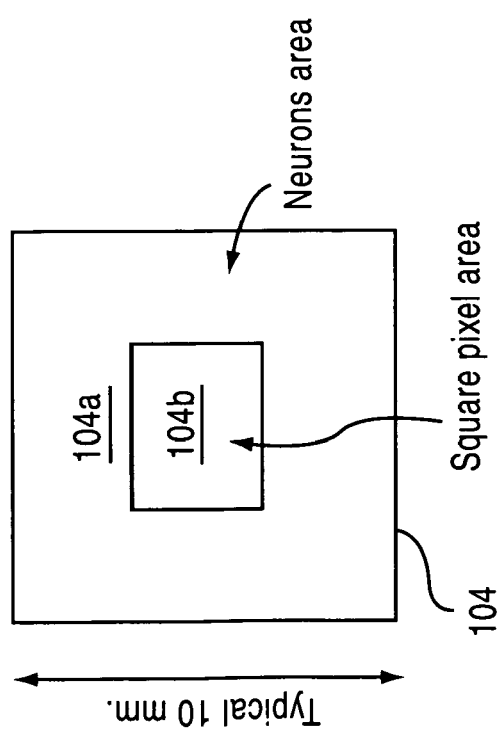

FIGS. 3A-B illustrate an exemplary embodiment of an individual CogniSensor 104. As shown in FIG. 3A, an area of concentrated neurons 104a surrounds a pixel sensing region 104b. The neurons in neuron area 104a can be coupled with sensing elements in pixel area 104b and can be configured to recognize patterns sensed by the pixel area 104*b*. As shown in FIG. 3B, a convex lens or micro-lens 102*a* is positioned over the pixel area 104*b* on the surface of a substrate 102 for focusing incident light onto the pixel area 104*b* or connected directly to the sensor without an intermediate substrate. Lens 102*a* could, for example, be chemically deposited onto the substrate by conventional means.

Figure 4:
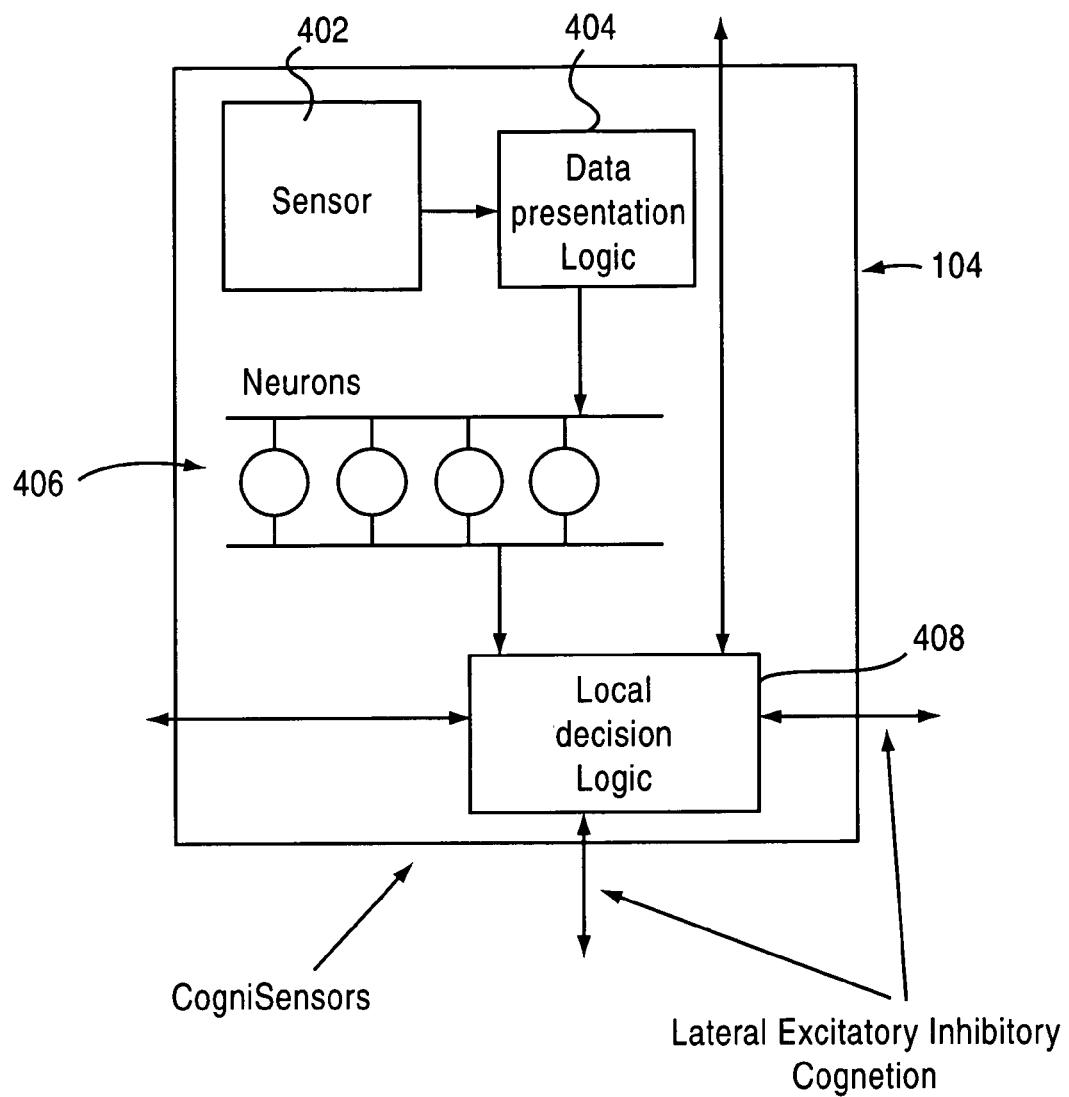
FIG. 4 is a block diagram of a sensors according to an embodiment of the present invention.

FIG. 4 is a functional block diagram of an exemplary CogniSensor 104 according to an embodiment of the present invention. CogniSensor 104 includes a sensor or sensing region 402, data presentation logic 404, a neural network 406, and local decision logic 408. The sensor 402 may include one or more sensing elements, such as photosensitive elements. The data presentation logic 404 is coupled with the sensing region 402 and the neural network 406 and is configured to present the data output from the sensors to the neurons in a manner suitable for processing. The neurons 406 are or become "taught" with knowledge and can process data input to neurons 406 from the presentation logic 404, and output processed data to the local decision logic 408, which makes a decision based on the processed data. Local decision logic 408 may be coupled with other CogniSensors or CogniMem by various known methods. Accordingly, CogniSensors 104 may be arranged in arrays and arrays of arrays.

Figure 5B:
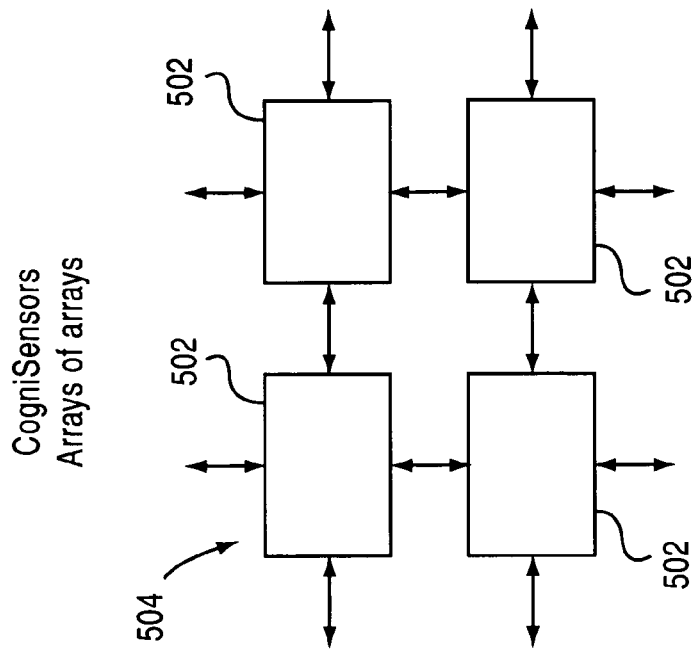
FIG. 5B is a block diagram of a sensors bank of arrays, according to an embodiment of the present invention.
Figure 5A:
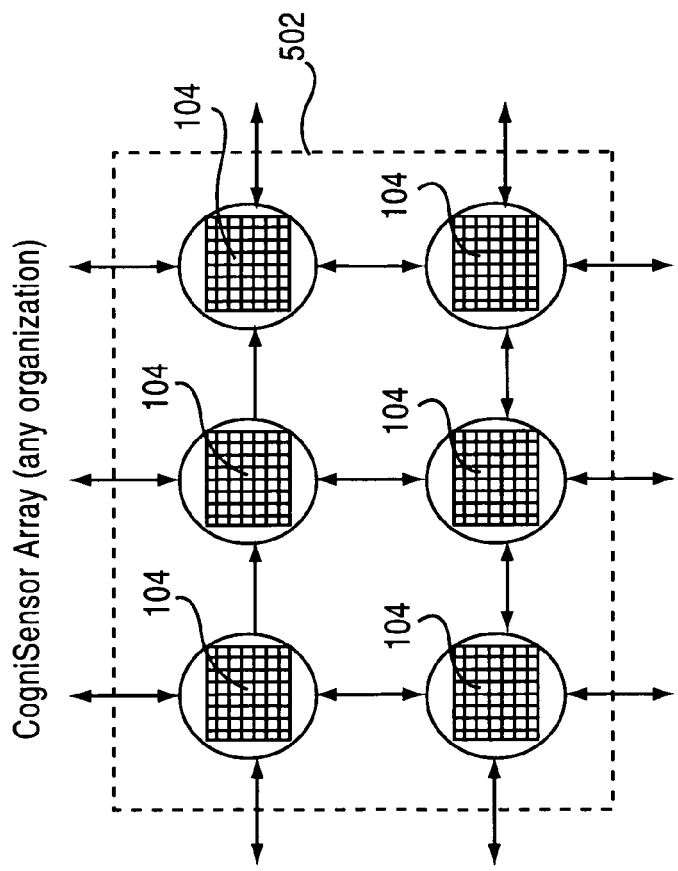
FIG. 5A is a block diagram of a sensors arrays according to an embodiment of the present invention.

FIGS. 5A and 5B show arrangements of arrays of CogniSensors. As shown in FIG. 5A, each CogniSensor 104 can be coupled with a plurality of CogniSensors 104 to for an array 502. As described below, input and output buses may be utilized for coupling of sensors in series or parallel.

As shown in FIG. 5B, each array 502 may be coupled with a plurality of arrays 502 to form a bank of arrays 504. By arranging arrays of arrays of CogniSensors 104, an extremely powerful recognition device is produced, that is both high-resolution and high-speed. That is, the resolution of the imaging device can be increased by increasing the number of sensors. However, by providing robust local decision capability in the form of CogniMem, the increase in the number of CogniSensors does not decrease processing speed of the device. Further, one will understand that the arrays can be organized in many different geometries and the invention is not limited to square arrays.

Figure 6B:
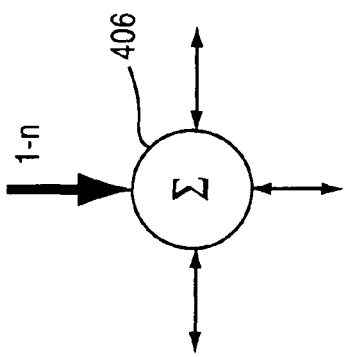
FIGS. 6A-C illustrate neural configurations according to embodiments of the present invention.
Figure 6A:
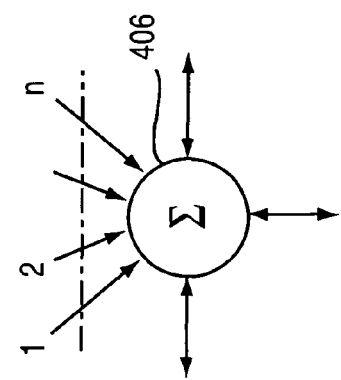

As mentioned above, each neuron can be coupled with a plurality of inputs 1-n, which can be, for example, multiplexed inputs, but is not limited thereto. FIG. 6A is a representation of a neuron having multiple inputs, which is simplified in FIG. 6B. As a result, an array of neurons can be assembled using an input bus 602 (there is no bus 602 on FIG. 6C), as shown in the simple parallel architecture in FIG. 6C. Each output of the neurons 406 can be connected to a global decision bus 406.

Figure 6C:
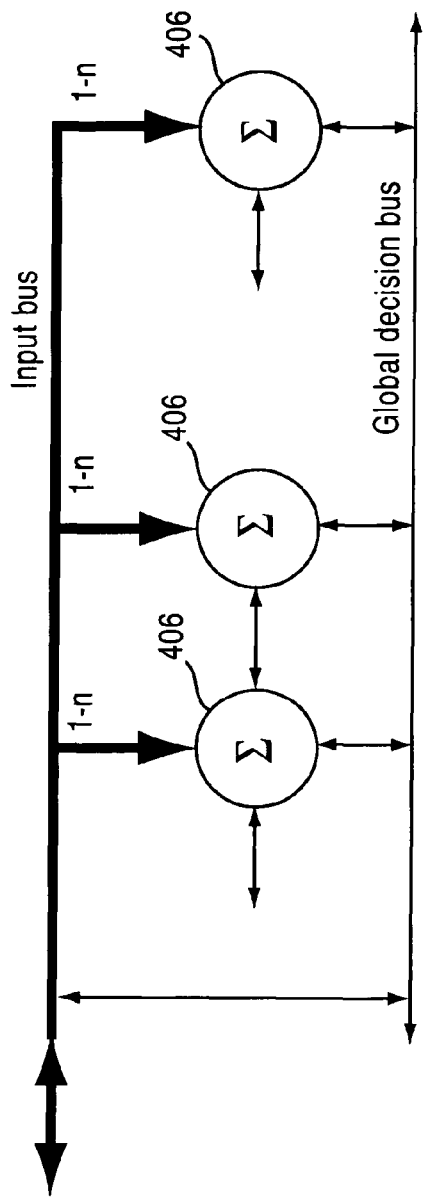
Figure 7:
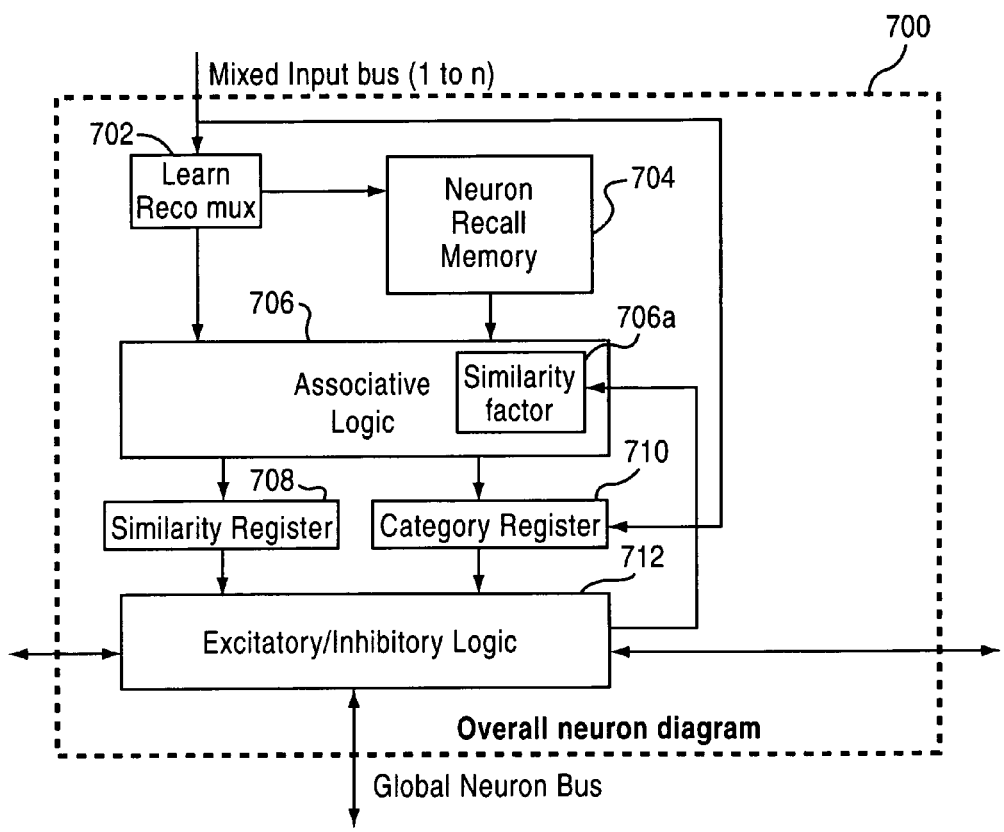
FIG. 7 is a block diagram of a neuron according to an embodiment of the present invention.

FIG. 7 is a functional block diagram of an exemplary neuron according to an embodiment of the present invention. The purpose of the neurons organized as an unlimited expansion network is to learn and recall digital vectors or signature (the pattern). Digital signatures are mostly spatial distributions of light intensity coded by a data reduction process. Neurons may be connected in parallel as represented in FIG. 6C, which means that all the neuron inputs are connected in parallel as well as all their outputs.

Data signals may be input from a multiplexed input bus (not shown) into the neuron 700. A learn multiplexer 702 can divide the multiplexed input signals and transmit input data signals into a neuron recall memory 704 and an associative logic element 706. The neuron recall memory 704 processes the input signals and outputs processed signals to the associative logic element 706. The associative logic element 706 includes a similarity factor deciding element 706*a*.

Every neuron can receive a broadcasted pattern (i.e., vector representing a digital signature of the sensor data) generated by the data presentation logic 404. This broadcasted pattern can be a transform (data reduction) of sensor generated data either instantaneous, or in the time domain.

A neuron has three possible subsequent chronological states: dormant, ready to learn (RTL) and thereafter committed. At least one neuron is in the RTL state at all times except if the network is full (i.e., all the neurons being committed). If one considers all the parallel connected neurons as a chain, the RTL neuron can move from the first position of the chain to the last position. In context of this representation, the RTL neuron will be typically on the right side of the committed neuron and the dormant neuron will be on the right side of the RTL neuron.

When a neuron is dormant, it will not react to any incoming pattern. A RTL neuron will load the incoming pattern into its recall memory in order to learn it if the user process decides so. This RTL neuron will have no participation in the recognition process but will be dedicated to build new knowledge while learning.

The learning process includes creating new knowledge when an unknown pattern occurs and the user decides to learn it. This knowledge addition will take place in the RTL neuron. In addition to creating a new knowledge, the committed neurons, which possibly wrongly identify an incoming pattern (i.e., fails to associate the proper category) will reduce their similarity domain to avoid further misclassification. This causes knowledge modification or "adaptive learning."

Photo elements can output a digitized radiometric value. The combination of all the values across a spatial distribution forms a pattern; such pattern can also evolve in the time domain and generate a stream of pattern. This pattern goes through a data reduction process which leads to the digital signature (vector) of the radiometric pattern. The reduction process must not exceed what is called the "minimum discrimination matrix" described below. For example with a 5×7 matrix, it is possible to discriminate all the European uppercase characters but not a Chinese Kanji character, for which a 16×16 matrix is needed.

A committed neuron learns a pattern when it is in the RTL state, by associating the vector loaded into the recall memory 704 with a category held into the category register 709. When the incoming pattern enters a committed neuron the learn/reco mux 702 will let transmit it to the associative logic 706 in order for this pattern to have its similarity evaluated toward the vector held into the recall memory 704. If the calculated similarity is found to be less or equal the similarity factor 706*a*, the neuron will be excited and therefore signal thru the logic 712. The function of the excitatory/inhibitory logic is to perform a global arbitration as many neurons become excited, among all the committed "firing" (i.e., excited) neurons and to "inhibit" those neurons which do no have the best similarity.

Region of Interest

Each CogniSensor may be associated to a region of interest (ROI) for a video frame. Each CogniSensor can extract a signature of the ROI to broadcast to its neurons (for learning or recognition purposes). The signature of the ROI is a compressed format of its pixel values reduced to fit into a sequence of N values with N being the size of the neuron's memory cells.

Take the example where a neuron is outfitted with a memory capacity of 256-bytes. A CogniSensor may classify a rectangular ROI of N×M pixels. The ROI signature will be reduced from N×M values to 256 values by, for example, simple block compression.

CogniSensors can be configured to process ROIs of any shape, and a choice of signature extractions can be application specific (e.g., part inspection, surface inspection, face recognition, target tracking, etc). Some signature extractions can integrate time, repetitivity, etc. Also, neurons can be outfitted with memory cells larger than 8-bit to accommodate inputs from sensors with 12-bit pixel resolution or more.

The combination of the neurons together with the sensor and the data presentation logic constitutes a totally novel approach for embedded image recognition without any software needed for either the learning or the recognition process.

The addressing of the CogniMem can be pass-through or selective (such as driven by the response of other CogniMem units).

It should be understood that a substrate hosting CogniSensor(s) serves as both a mechanical support and as a lens (See, e.g., FIGS. 1-2). The substrate can be, but is not limited to, a rigid or flexible, flat or curved, surface made of a glass, Plexiglas, plastic, Mylar or other material.

The connectivity between CogniSensors and CogniMem units on a same substrate should preferably use a minimum number of wires.

The knowledge loaded in the CogniSensors can preferably address the recognition of different families of patterns, whether related or not.

EXAMPLES

Figure 8:
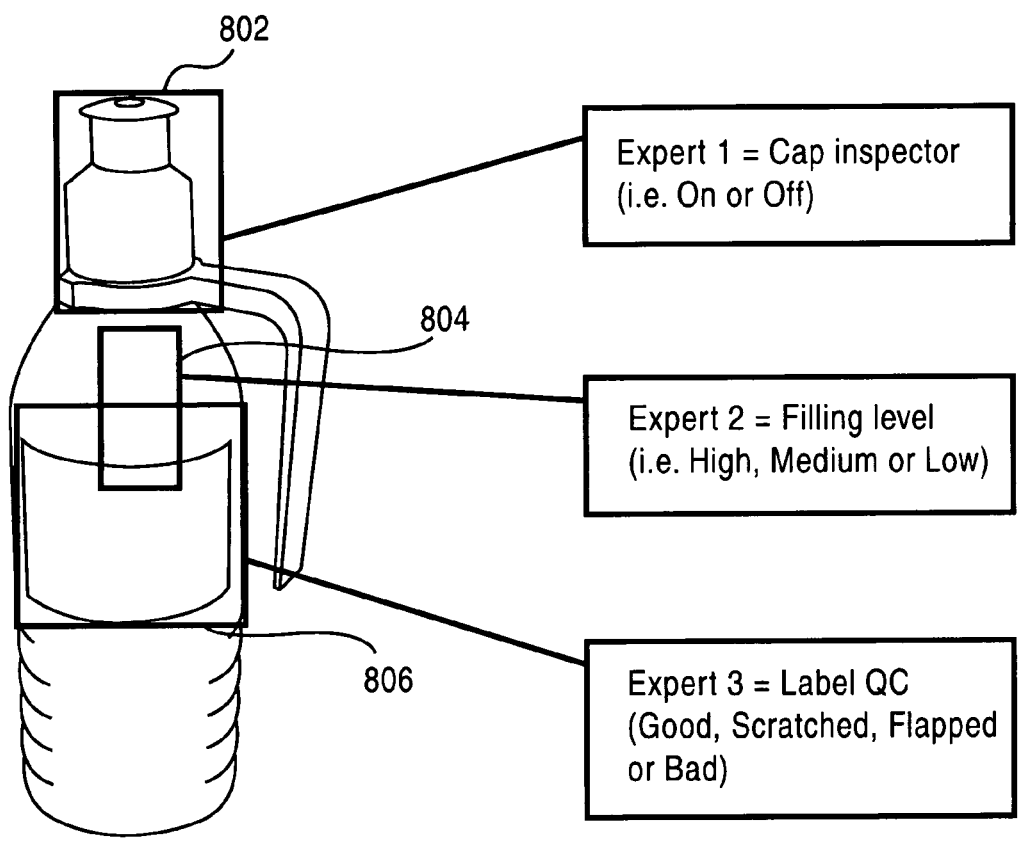
FIGS. 8-12 illustrate exemplary applications of the image recognition device according to embodiments of the present invention.

According to an embodiment of the present invention, CogniSensors are ideal for performing inspection during an automated manufacturing process. As shown in FIG. 8, one or more CogniSensors could be used to inspect a water bottle. In this example, three different CogniSensors are used to inspect three different regions referenced as Expert 1-3. The global response can depend on the combined responses of the three "expert" CogniSensors.

In this example, CogniSensor 1 (Expert 1) can be trained to classify signatures of the ROI containing the cap of the bottle 802. CogniSensor 1 can classify its ROI into 2 categories: Good and Bad. The Bad category can combine several cases: the cap is missing or the cap is not screwed on properly.

Similarly, CogniSensor 2 (Expert 2) can learn signatures of the ROI crossing the line of fluid in the bottle 804. The ROI can be a narrow vertical rectangle and would ideally cover the minimum and maximum possible filling levels in the bottle. Depending on the quality control criteria of the manufacturer, CogniSensor 2 can classify its ROI into any number of categories, for example: Acceptable and Not Acceptable; Too High, Acceptable and Too Low; or Too High, High but Acceptable, In Range, Low but Acceptable, Too Low.

CogniSensor 3 (Expert 3) can learn signatures of the region of interest covering the label area 806. CogniSensor 3 can be trained to recognize a diversity of cases or combination of cases such as for example: Missing label, Defective label (torn, scratched or folded), misplaced labels (up side down, slanted) and Good.

An output from CogniSensors 1-3 could be provided to controller associated with the automated manufacturing process to take appropriate action based on the decisions made thereby.

Figure 9A:
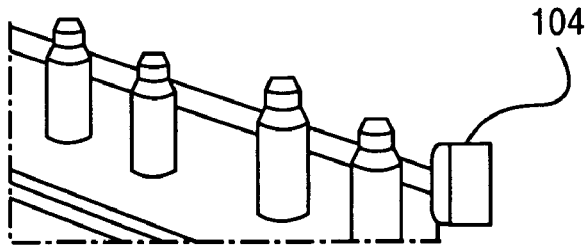
Figure 9B:
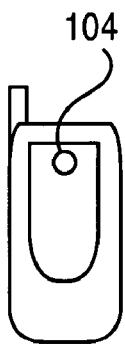
Figure 9C:
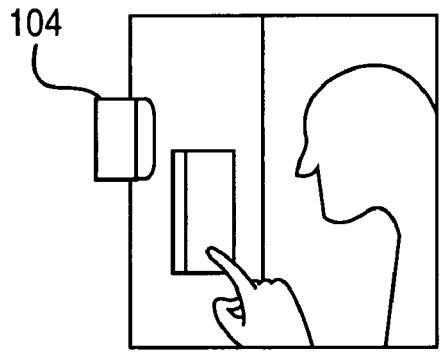

According to an embodiment of the present invention, CogniSensors can be individually packaged to form a smart photocell or smart microlens. Such a device has application to a large number of technologies and could be used, for example, to detect moving parts, identify routes or route moving parts in a mechanized assembly process (FIG. 9A); for biometric identification, such as in a camera phone (FIG. 9B); or for visitor detection and identification in a door peep hole or the like (FIG. 9C).

Figure 10:
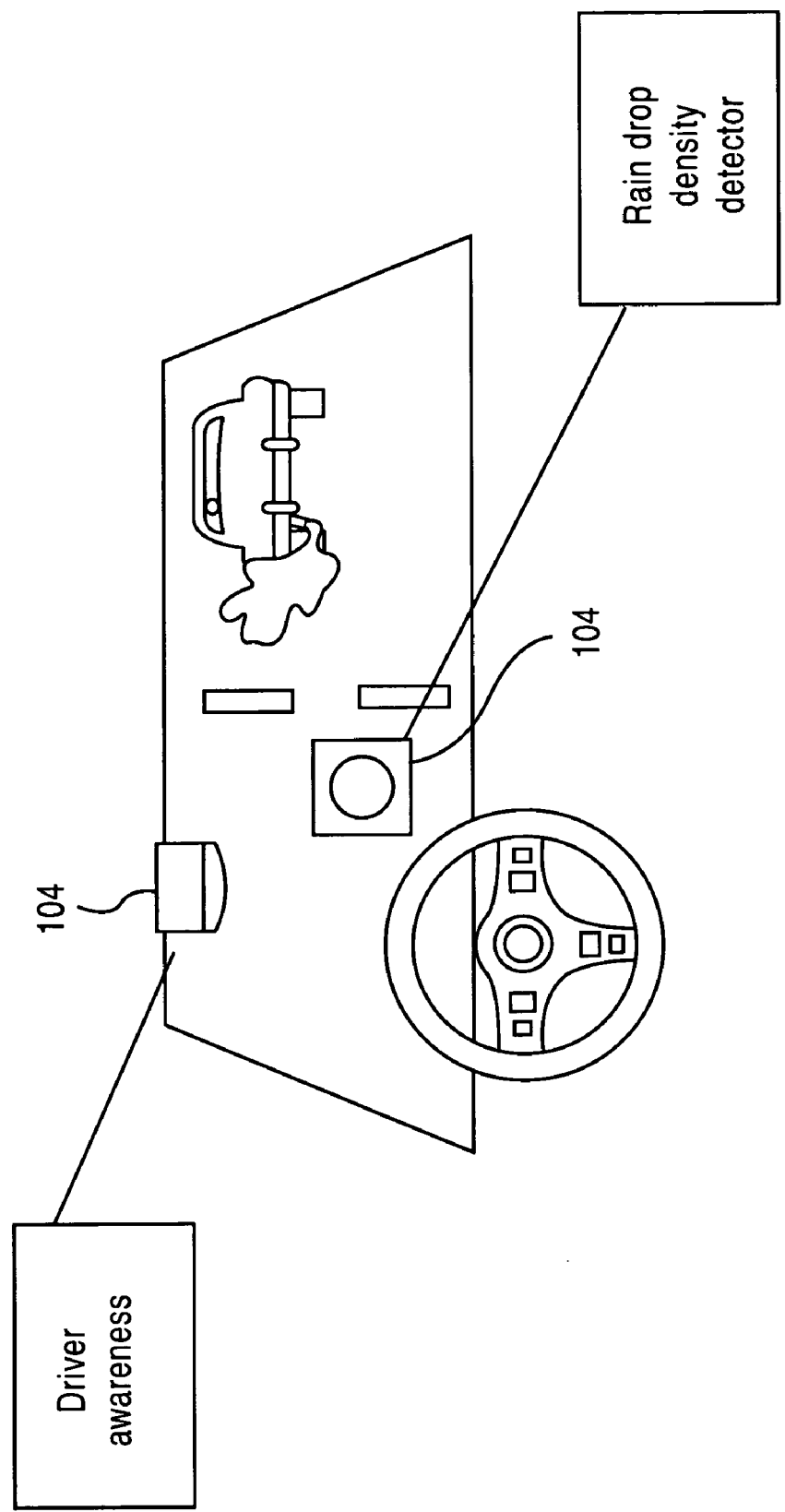

According to another embodiment of the present invention, a driver awareness detection system is provided. Referring to FIG. 10, one or more CogniSensors 104 may be embedded in a windshield, dashboard flat panel display, or headlight of a motor vehicle. CogniSensors 104 can be taught to recognize patterns that indicate when a driver is no longer attentive (e.g., the driver is falling asleep) and output a signal to trigger an alarm. Such patterns could include gaze tracking, face recognition, facial expression recognition and more. Further, CogniSensors 104 in a windshield or headlight could be taught to recognize objects or events external to the vehicle, such as for identifying rain drops with a windshield wiper system or road hazards for a road hazard warning system.

The detection of an object which can appear randomly in the far or near field of view can be made a number of ways. For example, two or three sensors can be outfitted with lenses focusing at different distances. The sensors can be loaded with the same knowledge, but work on regions of interest with different sizes. The global response of the recognition system can be considered positive if at least one sensor recognizes the object.

Also, CogniSensors can be designed with input sensors sensitive to different wavelengths such as Near-IR, IR, color filtered, etc. For a given object or scene, such CogniSensors will produce different pixel values but can be trained on their respective video image to recognize the categories of objects. In target tracking, the combination of near-IR and IR CogniSensors will give the ability to recognize a target at any time of the day.

Figure 11A:
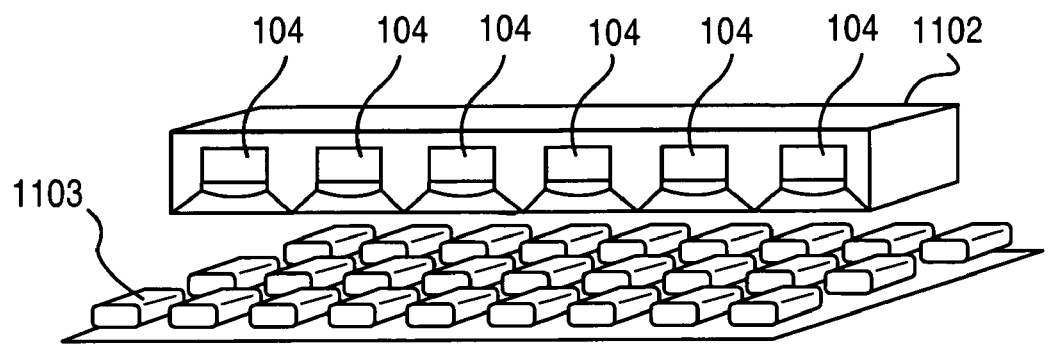
Figure 11B:
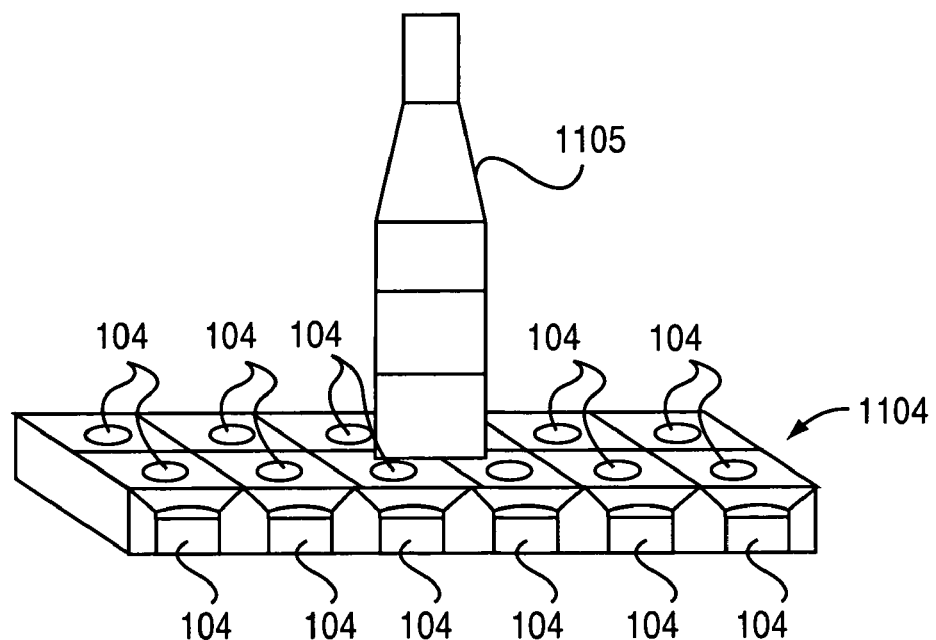

According to another embodiment of the present invention, arrays of CogniSensors can be used in many other manufacturing applications. For example, as shown in FIG. 11A, a 1-dimensional array of CogniSensors 1102 can be used to for inspection of glass floats 1103 in a manufacturing process. As shown in FIG. 11B, a 2-dimensional array of CogniSensors 1104 can be used for detection of contaminants at the bottom of containers 1105, such as beverage bottles. In such applications, each CogniSensor can be taught to identify patterns that indicate flaws in glass or contaminants in a fluid.

Figure 12:
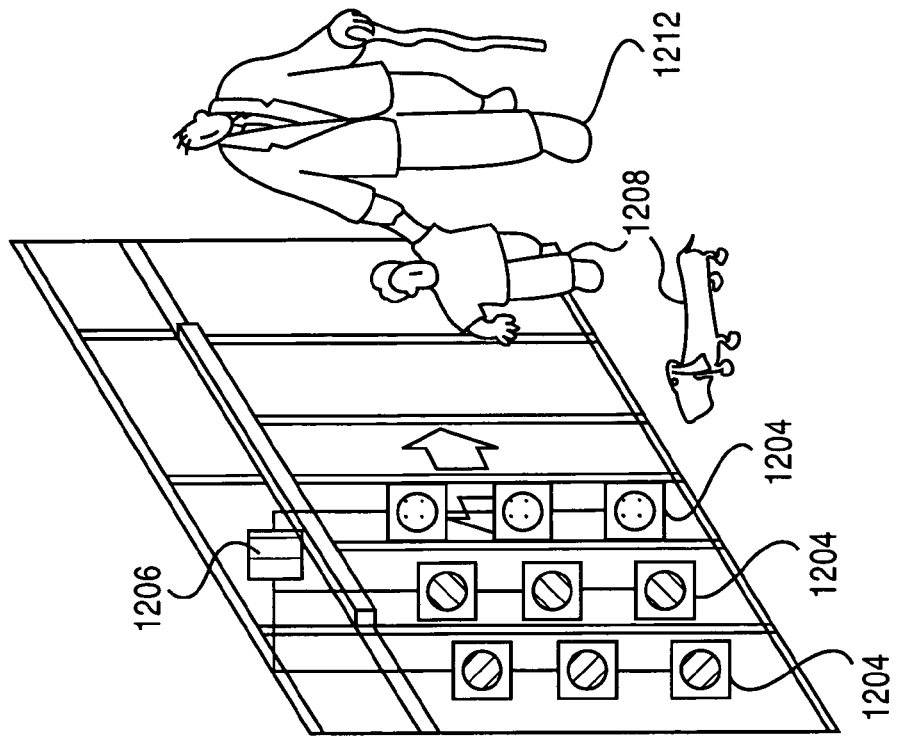

According to another embodiment of the present invention, CogniSensors can be distributed across a glass plane or the like, to perform multiple independent functions. CogniSensors can be grouped and taught with different knowledge per group. FIG. 12 shows as one example, a sliding glass door 1202 that includes several groups of CogniSensors 1204 for detecting approaching objects of different size. A first group could be taught with knowledge for recognizing a first size 1208 of human or animal (e.g., dog), while a second group can be taught for a different size person (e.g., boy) 1210, a third group for another size person (e.g., adult) 1212, and so forth. Each group 1204 could be coupled with one or more CogniMems 1206 for control of the sliding door.

As should be apparent to one skilled in the art after reviewing this patent document, the imaging device of the present invention could be useful in innumerable other applications not listed here. Fore example, another application includes permanent damage detection (texture change) in dam, bridge or other manmade construction. Implementation of such application should be apparent from the above description of embodiments of the present invention. Further, power and signal transmission could be wireless (e.g., infra red, photocell, induction loop, etc.)

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. An image recognition device comprising:
   a sensing area embedded in or positioned on a transparent or semi-transparent substrate; and
   a processing element coupled with said sensing area, said processing element being embedded in or positioned on the substrate;
   wherein said transparent or semi-transparent substrate constitutes an optical interface between an incident image to be sensed and a sensing pixel of said sensing area.

2. The image recognition device as recited in claim 1, wherein said sensing area is transparent or semi-transparent.

3. The image recognition device as recited in claim 1, wherein said substrate comprises glass, plexi-glass or other transparent material.

4. The image recognition device as recited in claim 1, wherein said sensing area comprises one or more photo-sensitive elements, and said processing element includes one or more cognitive memory elements,
   wherein each said photo-sensitive element is configured to output a signal based on light received at an input, and each said cognitive memory element is configured to recognize a pattern from said signals output from said photo-sensitive elements.

5. The image recognition device as recited in claim 4, wherein said cognitive memory elements are trainable.

6. The image recognition device as recited in claim 4, wherein each said cognitive memory element comprises a plurality of neurons coupled on an input side thereof by a multiplexed input bus and on an output side thereof by an output bus, each said neuron being taught with a knowledge, said knowledge allowing the corresponding neuron to recognize a signal and perform a decision.

7. The image recognition device as recited in claim 1, wherein said substrate includes a plurality of lens portions, each lens portion providing an optical interface with a sensing pixel or pixel area of said image recognition device.

8. The image recognition device as recited in claim 7, wherein each lens portion is formed by etching of said substrate.

9. The image recognition device as recited in claim 1, wherein the image recognition device includes a plurality of the sensing areas organized in an array.

10. An image recognition device comprising:
    a plurality of cognitive sensors positioned on a transparent or semi-transparent substrate, each sensor comprising:
      a photo sensitive element; and
      a trainable cognitive memory cell associated to the photosensitive element;
    a plurality of optical interfaces formed on said substrate each optically coupled with a corresponding one of said plurality of cognitive sensors.

11. The image recognition device as recited in claim 10, wherein said optical interfaces are lenses formed by etching said substrate at position near each said cognitive sensor.

12. The image recognition device as recited in claim 10, wherein each cognitive sensor is trainable and configured to recognize patterns based on incident light.

13. The image recognition device as recited in claim 10, wherein each said cognitive memory element comprises a plurality of neurons coupled on an input side thereof by a multiplexed input bus and on an output side thereof by an output bus, each said neuron being taught with a knowledge, said knowledge allowing the corresponding neuron to recognize a signal and perform a decision.

14. The image recognition device as recited in claim 10, wherein said substrate comprises glass, plexi-glass, or other transparent material.

15. The image recognition device as recited in claim 13, wherein each cognitive memory cell is taught to recognize a different portion of an image, and said plurality of cognitive memory cells are configured to operate collectively to recognize said image.

16. The image recognition device as recited in claim 15, wherein said cognitive sensors are configured to output a signal upon the recognition of said image.

17. The image recognition device as recited in claim 10, wherein said cognitive sensors operate in parallel at low frequencies.

18. The image recognition device as recited in claim 10, wherein the cognitive sensors operate at very low current.

19. An image recognition device comprising:
    a transparent or semi-transparent substrate;
    cognitive sensing means for sensing patterns of incident light and outputting a signal based on the sensed patterns, said cognitive sensing means being embedded into said substrate; and
    optical interface means for providing an optical interface to said cognitive sensing means.

20. The image recognition device as recited in claim 19, wherein said cognitive sensing means comprises a plurality of photo-detectors and a plurality of cognitive memory cells,
    wherein each said photo-detector is configured to output a signal based on light received at an input, and each said cognitive memory cell is configured to recognize a pattern from said signals output from said photo-detectors.

21. The image recognition device as recited in claim 19, wherein said optical interface means comprises a plurality of lenses formed in said substrate.

22. The image recognition device as recited in claim 19, wherein said cognitive sensing means comprises:
    a plurality of cognitive sensors, each comprising:
      a photo sensitive element; and
      a trainable cognitive memory cell associated to the photosensitive element.

23. The image recognition device as recited in claim 22, wherein each said cognitive memory cell comprises a plurality of neurons coupled on an input side thereof by a multiplexed input bus and on an output side thereof by an output bus, each said neuron being taught with a knowledge, said knowledge allowing the corresponding neuron to recognize a signal and perform a decision.

24. The image recognition device recited in claim 19, wherein said cognitive sensing means performs image recognition operations digitally without a software program through a plurality of parallel elements each having self contained, autonomous behavior.

25. The image recognition device as recited in claim 1, wherein the image recognition device is configured to output a wireless output signal.

26. The image recognition device as recited in claim 10, wherein each cognitive sensor is configured to send and receive wireless signals.

27. The image recognition device as recited in claim 19, wherein cognitive sensing means is configured to send and receive wireless signals.

28. The image recognition device as recited in claim 1, wherein the device is powered wirelessly.

29. The image recognition device as recited in claim 10, wherein the device is powered wirelessly.

30. The image recognition device as recited in claim 19, wherein the device is powered wirelessly.

31. An image recognition device comprising a combination of neurons with a sensor and data presentation logic, wherein said combination is embedded in or positioned on a transparent or semi-transparent substrate.

32. An image recognition method comprising steps of:
embedding in or depositing on a transparent or semi-transparent substrate, cognitive sensing device configured to sense patterns of incident light and outputting a signal based on the sensed patterns; and
providing an optical interface element configured to provide an optical interface to said cognitive sensing device.

33. The image recognition method as recited in claim 32, wherein said cognitive sensing device comprises a plurality of photo-detectors and a plurality of cognitive memory cells, wherein each said photo-detector is configured to output a signal based on light received at an input, and each said cognitive memory cell is configured to recognize a pattern from said signals output from said photo-detectors.

34. The image recognition method as recited in claim 32, further comprising a step of providing a plurality of lenses formed in or deposited on said substrate as part of said optical interface element.

35. The image recognition method as recited in claim 32, wherein said cognitive sensing device comprises:
a plurality of cognitive sensors, each comprising:
a photo sensitive element; and
a trainable cognitive memory cell associated to the photosensitive element.

36. The image recognition method as recited in claim 35, wherein each said cognitive memory cell comprises a plurality of neurons coupled on an input side thereof by a multiplexed input bus and on an output side thereof by an output bus, each said neuron being taught with a knowledge, said knowledge allowing the corresponding neuron to recognize a signal and perform a decision.

37. An image recognition method comprising:
using a plurality of optical interfaces embedded in or provided on a transparent or semi-transparent substrate to provide an optical path to a plurality of sensing elements embedded in or provided on said substrate, and
processing in parallel signals generated from said plurality of sensing elements in a plurality of processing elements each coupled to one of said sensing elements and each embedded in or provided on said substrate.

* * * * *